UNITED STATES PATENT OFFICE.

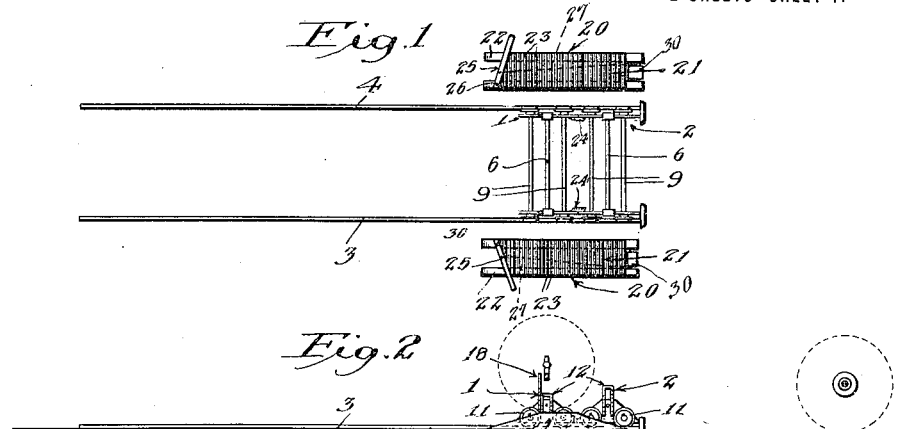
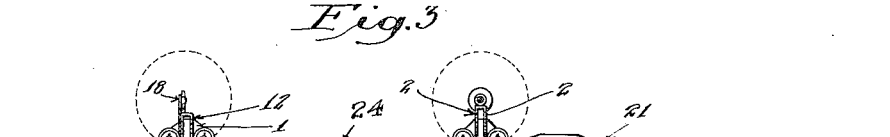
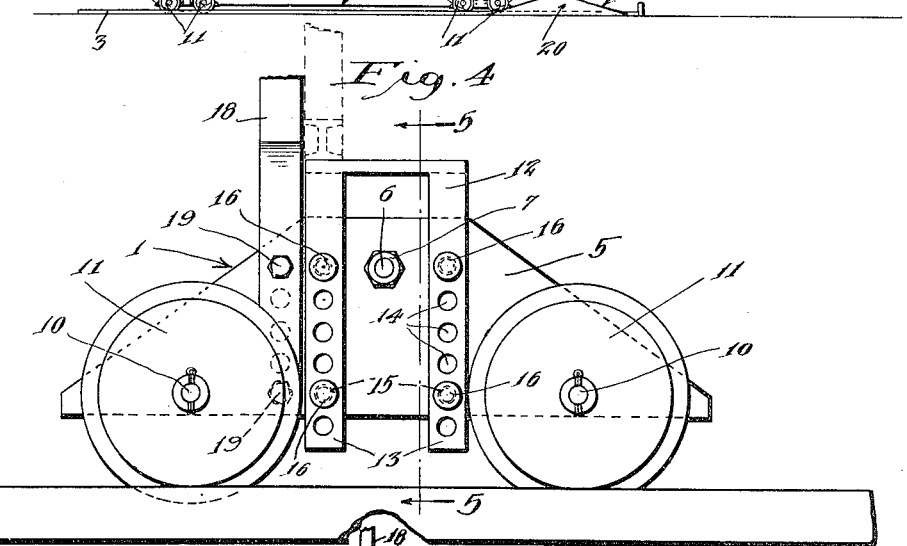
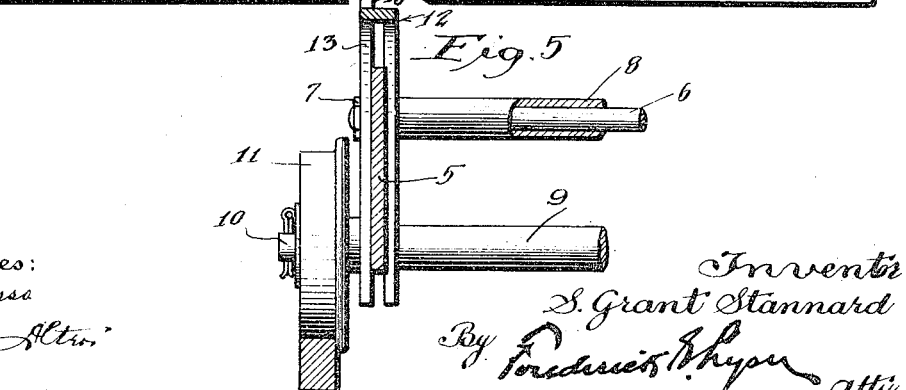

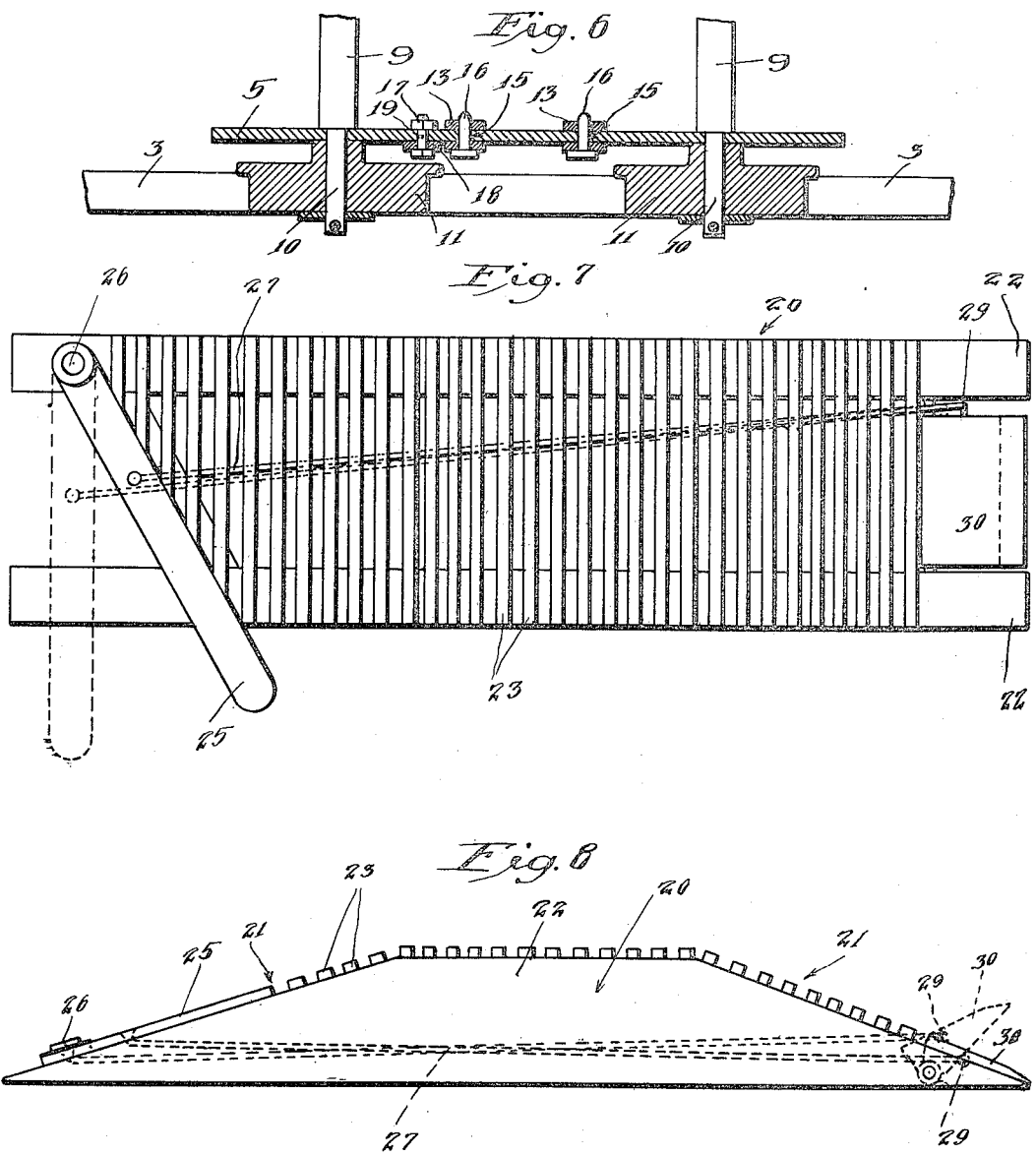

S. GRANT STANNARD, OF LONG BEACH, CALIFORNIA.

AUTOMOBILE-TIRE-SAVING DEVICE.

1,252,625.  Specification of Letters Patent.  Patented Jan. 8, 1918.

Application filed December 18, 1916. Serial No. 137,507.

*To all whom it may concern:*

Be it known that I, S. GRANT STANNARD, a citizen of the United States, residing at Long Beach, in the county of Los Angeles and State of California, have invented a new and useful Automobile-Tire-Saving Device, of which the following is a specification.

This invention relates to improvements in automobile tire saving devices and resides in the provision of a device by means of which an automobile when stored may be suspended from the ground so that the weight thereof will not be placed upon the tires.

An object of the invention is to provide a device of the above character which is simple in construction, comparatively small, automatic in operation and inexpensive to manufacture and install.

Another and more specific object is to provide a means for engaging the front and rear axles of the automobile as the latter is driven over a given point so that further movement of the automobile in a given direction will cause it to be elevated clear of the ground and held in such position.

The accompanying drawings illustrate the invention:

Figure 1 is a top plan view of the device;
Fig. 2 is a side elevation showing the parts in normal position and the wheels of an automobile in diagrammatic relation thereto prior to the elevating of the wheels from the ground;
Fig. 3 is a side elevation showing the device in operative position and the wheels of an automobile in suspended relation to the ground in dotted lines;

Fig. 4 is an enlarged fragmentary detail side elevation of one of the axle engaging members or carriages;

Fig. 5 is an enlarged fragmentary vertical sectional view of one of the carriages taken on line 5—5 of Fig. 4;
Fig. 6 is a horizontal sectional view taken through one of the carriages;

Fig. 7 is a top plan view of one of the elevating members; and

Fig. 8 is a side elevation of one of the elevating members.
vating members.

Referring to the drawings, 1 and 2 respectively, designate front and rear axle supporting carriages that are movable backward and forward upon parallel rails 3 and 4, the latter being suitably mounted upon a floor or other supporting surface.

Each of the carriages comprises a pair of plates 5 connected by a brace rod 6 held in position by nuts 7. A tubular spacer member 8 receives the rod 6 and abuts the opposed faces of the plates 5 at its ends. A pair of axles 9 is connected with the plates 5 and each axle lies parallel to the rods 6, the ends of the axles being reduced to provide trunnions 10 which extend from the outer sides of the plates and have flanged rollers 11 mounted thereon, said rollers riding upon the rails 3 and 4.

Vertically adjustably mounted upon each of the plates 5 is an inverted U-shaped axle engaging member 12, the arms of which are bifurcated as at 13 and receive the plates as shown clearly in Figs. 4 and 5. The arms of the members 12 are provided with equidistantly spaced openings 14 which register with corresponding openings 15 in the plates. Pins 16 are inserted through certain alined openings 14 and 15 to hold them in position. By this arrangement it will be seen that the members 12 may be held at the desired height dependent upon the height of the automobile axle relative to the apparatus. An axle abutment member 18 extending above the edge of the member 12 of the carriage 1 is connected as at 19 for vertical adjustment with the plate 12, said connections being the same as those for the members 12. This member 18 is adapted to be engaged by the axle so that the carriage will be moved into the right position for engagement with the axle.

Fixed to the floor or other surface which supports the rails 3 and 4 at opposite points and at the outer sides of the rails are means for elevating the wheels of an automobile comprising elevating blocks 20 which have their ends upwardly inclined at 21. These blocks comprise parallel side bars 22 supporting spaced transverse slats 23. This construction provides a roughened surface upon which the wheels will readily tract.

A flexible element 24 is connected with the carriages 1 and 2 and is of a length corresponding approximately to the wheel base of an automobile with which the device is adapted to coöperate. This member functions to pull the rear axle engaging carriage 2 into position to be engaged by the rear axle of an automobile after the front axle has been engaged by and the automobile is elevated upon the front axle supporting member.

There is preferably provided means to give a bearing surface to the rear wheels when the latter are elevated so that the automobile may be run backward over the blocks 20 and back upon the ground or other support. This means comprises arms 25 which are pivoted at 26 to the blocks 20 at the inner ends of the blocks and upon one side of each.

There is provided a means for automatically returning the arms 25 to normal position so that the device is set for operation as the automobile is being backed off of the supporting elements thereof. This means comprises a rod 27 which is pivotally connected with the arms 25 of each of the blocks 20 intermediate the ends thereof and which extends between the blocks 22 to the other end of said members at which point it is pivotally connected at 29 with a pivoted trip member 30, the latter being suitably pivoted between the ends of the blocks 22 and adapted to be engaged by the rear wheels of the automobile as the latter are backed off of the blocks 20.

In operation, the carriages 1 and 2 are mounted in the positions shown in Figs. 1 and 2 of the drawings, the carriage 1 being mounted between the blocks 20, and the carriage 2 being located rearwardly thereof. The members 12 on the carriages, as well as the members 18 on the carriage 1, are adjusted so as to coöperate with the particular kind of automobile adapted to be driven upon the device. As the front wheels of the automobile are driven upon the blocks 20 and the forward part of the automobile is elevated, the axle thereof shown in diagram in Fig. 2 of the drawings will engage the member 18 and cause the carriage 1 to be moved forwardly in correspondence with the movement of the axle. When the wheels roll downwardly upon the inclined inner ends of the blocks 20 the axle moves downwardly accordingly and will rest upon the members 12. As the carriage 1 is moved forwardly by a further movement of the automobile, the flexible element 23 will communicate a pull to the carriage 2 and pull the latter into the position formerly that of the carriage 1. Thus as the rear wheels move from the tops of the blocks downwardly over the inner inclined ends thereof and back onto the ground or other supporting surface, the carriage 2 moves accordingly, the rear axle engages the member 12 of the carriage 2 and the carriage and axle assume the position shown in Fig. 3 of the drawings, with the front and rear wheels spaced from the ground or other surface, the rear wheel being located adjacent to but spaced from the inner inclined ends of the blocks 20. To run the automobile from off of the axle supporting means therefor, the projecting outer ends of the arms 25 are moved so as to bring the plates at right angles to the block bars 22 and into the dotted line position shown in Fig. 7 of the drawings. This moves the plates into engagement with the rear wheels of the automobile and provides for the traction thereof upon the blocks.

When the arms 25 are moved into operative position, a pull is communicated through the rods 27 which rock the trip members 30 so that the upper ends thereof are in a position to be engaged by the rear wheels of the automobile. As the automobile is backed off of the blocks 20, the rear wheels will engage the upper ends of the members 30, said upper ends being enlarged and move said ends downwardly, rocking the member and causing the rods 27 to be pulled rearwardly and the arms 25 to be moved into normal position as shown in full lines in Fig. 7 of the drawings.

With reference to the foregoing description and accompanying drawings, it will be seen that I have provided a tire saving device which may be used to advantage in private garages as well as public ones and will be automatic in operation. One of the essential features of the invention is that it is only necessary to drive the automobile slowly over the blocks 20 to cause the rear wheels thereof to be spaced and held spaced from the ground so that the weight of the automobile will not rest upon the tires. It will be seen that the device may be made to coöperate with various makes of automobiles, it only being necessary to regulate the length of the flexible element 24 and the height of the axle supporting members 12 in accordance with the particular make of automobile with which the device is to coöperate, and this adjustment may be readily effected. By using the flexible connection instead of a rigid connection between the carriages, it will be seen that the device may be installed so as to take up comparatively little room. The flexible connection does not require the use of long rails as would be the case where a rigid connection is used and enables the two carriages to be located close to one another when the device is in position for operation.

I claim:

1. An automobile tire saving device comprising two horizontal rails, front and rear axle supporting carriages freely movable in the same horizontal plane toward and from one another upon the rails, a pair of blocks over which the wheels of an automobile are adapted to pass, each block being fixedly mounted on the outside of the rails and having inclined surfaces at its ends, an axle abutment member on the front axle supporting carriage and extending above the axle supporting surface of the carriage, and a flexible element connecting the carriages and being approximately equal in length to the distance between the axles of the automobile which are to be supported by the carriages.

2. An automobile tire saving device comprising carriages for supporting the front and rear axles adapted to normally stand adjacent to one another, the distance between said carriages normally being considerably less than the distance between the axles of the automobile to be supported, and being freely movable toward and from one another in the same horizontal plane, stationary means to elevate and lower the front and rear wheels of an automobile successively allowing the automobile to rest upon the carriages when the wheels are successively lowered, and means whereby engagement of one carriage by the automobile when elevated will move said carriage away from the other carriage and move said last named carriage into automobile supporting position including a flexible element connecting the carriages.

3. In combination, a carriage to receive the front axle of an automobile and support the front wheels of an automobile in spaced relation to the ground, a second carriage adapted to stand adjacent to the first named carriage to likewise support the rear axle of an automobile, said carriages being movable in the same horizontal plane, stationary means to raise the wheels of the automobile when said automobile moves toward the carriages and to lower the wheels when the axles of the automobile are adjacent to the carriages to permit the axles to rest upon the carriages, and means whereby motion of the first carriage after a predetermined free movement thereof will move the second carriage into position to support the rear axle of the automobile, the distance between said carriages being normally less than the distance between the axles of the automobile to be supported.

4. In combination, a carriage to receive the front axle of an automobile and support the front wheels of an automobile in spaced relation to the ground, a second carriage adapted to stand adjacent to the first named carriage to likewise support the rear axle of an automobile, said carriages being movable in the same horizontal plane, the distance between said carriages being less than the distance between the axles of the automobile to be supported, stationary means to raise the wheels of the automobile when said automobile moves toward the carriages and to lower the wheels when the axles of the automobile are adjacent to the carriages to permit the axles to rest upon the carriages, means whereby motion of the first carriage after a predetermined free movement thereof will move the second carriage into position to support the rear axle of the automobile including an axle abutment member extending above the axle supporting surface of the rear axle supporting carriage, and a flexible element connecting the carriages and being equal approximately in length to the distance between the front and rear axles of the automobile.

5. An automobile tire saving device comprising two rails, front and rear axle supporting carriages freely movable toward and from one another upon the rails, blocks over which the wheels of an automobile are adapted to pass, mounted opposite one another on the outside of the rails and having inclined surfaces at their ends, an axle abutment member on the front axle supporting carriage and extending above the axle supporting surface of the carriage, a flexible element connecting the carriages and being approximately equal in length to the distance between the axles of the automobile which are to be supported by the carriages, and arms pivoted at the forward ends of the blocks for engagement with the tires of an automobile to provide a traction surface for the tires.

6. An automobile tire saving device comprising two rails, front and rear axle supporting carriages freely movable toward and from one another upon the rails, blocks over which the wheels of an automobile are adapted to pass, mounted opposite one another on the outside of the rails and having inclined surfaces at their ends, an axle abutment member on the front axle supporting carriage, a flexible element connecting the carriages and being approximately equal in length to the distance between the axles of the automobile which are to be supported by the carriages, arms pivoted at the forward ends of the blocks for engagement with the tires of an automobile to provide a traction surface for the tires, and means operated by the wheels of the automobile when the latter are backed off of the blocks to return said arms to normal position.

7. In combination, stationary means to elevate and lower the front and rear wheels of an automobile successively, carriages freely movable toward and from one another in the same horizontal plane and connected together by a flexible element, said carriages adapted to support the front and rear axles of an automobile normally standing adjacent one another, the distance between the carriages being less than the distance between the axles of the automobile to be supported, said carriages receiving the axles of the automobile when the wheels thereof are lowered.

8. In a tire saving device for automobiles, a track, carriages mounted on the track for movement toward and away from one another and adapted to support the front and rear axles of an automobile, a flexible element connecting said carriages and being approximately equal in length to the distance between the axles of the automobile to be supported thereby, blocks mounted on opposite sides of the track and having inclined surfaces at their ends, and arms pivoted to the certain ends of the blocks and adapted to be moved into and out of position for engagement with the rear tires of an automobile when the tire is supported upon the carriages.

9. In a tire saving device for automobiles, a track, carriages mounted on the track for movement toward and from one another and adapted to support the front and rear axles of an automobile, a flexible element connecting said carriages and being approximately equal in length to the distance between the axles of the automobile to be supported thereby, blocks mounted on opposite sides of the track and having inclined surfaces at their ends, arms pivoted to the certain ends of the blocks and adapted to be moved into and out of position for engagement with the rear tires of an automobile when the automobile is supported upon the carriages, and means carried by the blocks and operated by the wheels of the automobile to return the arms to normal position when the automobile is removed from the carriages and the wheels thereof run over the blocks.

10. In a tire saving device for automobiles, a horizontal track, front and rear axle supporting carriages, rollers on the carriages and mounted on the tracks, said carriages being freely movable toward and from one another and normally standing close to one another so that the distance between them is less than the distance between the axles of the automobile to be supported, a flexible element approximately equal in length to the distance between the axles of the automobile to be supported connecting the carriages with one another, stationary means on opposite sides of the track for raising and lowering the front and rear wheels of an automobile successively permitting the axles to engage with the carriages successively when the wheels are lowered and a front axle abutment member carried upon the front axle supporting carriage and extending above the front axle supporting surface of the carriage.

Signed at Los Angeles, California, this 9th day of December, 1916.

S. GRANT STANNARD.

Witnesses:
CHAS. J. CHUNN,
L. BELLE WEAVER.